United States Patent [19]

Suga et al.

[11] Patent Number: 4,514,742
[45] Date of Patent: Apr. 30, 1985

[54] PRINTER HEAD FOR AN INK-ON-DEMAND TYPE INK-JET PRINTER

[75] Inventors: Michihisa Suga; Mitsuo Tsuzuki, both of Tokyo, Japan

[73] Assignee: Nippon Electric Co., Ltd., Tokyo, Japan

[21] Appl. No.: 480,088

[22] Filed: Mar. 30, 1983

Related U.S. Application Data

[63] Continuation of Ser. No. 274,210, Jun. 16, 1981, abandoned.

[30] Foreign Application Priority Data

Jun. 16, 1980 [JP] Japan ................... 55-81184
Nov. 21, 1980 [JP] Japan ................. 55-164343

[51] Int. Cl.³ .................................... G01D 15/16
[52] U.S. Cl. .................... 346/140 R; 137/513.7; 137/855; 137/859; 417/322; 417/566
[58] Field of Search ............ 346/75, 140 R; 417/413, 417/322, 566; 137/859, 855, 513.7

[56] References Cited

U.S. PATENT DOCUMENTS

| | | | |
|---|---|---|---|
| 2,928,409 | 3/1960 | Johnson | 417/322 X |
| 3,070,029 | 12/1962 | Russell | 417/566 X |
| 3,176,712 | 4/1965 | Ramsden | 137/859 X |
| 3,381,623 | 5/1968 | Elliott | 417/413 |
| 3,452,360 | 6/1969 | Williamson | 346/140 |
| 3,550,616 | 12/1970 | Graham | 137/513.7 |
| 3,787,882 | 1/1974 | Fillmore | 346/140 X |
| 3,848,118 | 11/1974 | Rittberg | 346/140 X |
| 3,852,773 | 12/1974 | Sicking | 346/140 |
| 4,216,477 | 8/1980 | Matsuda | 346/140 |
| 4,233,610 | 11/1980 | Fischbeck | 346/140 |
| 4,281,329 | 7/1981 | Yano | 346/75 X |
| 4,284,996 | 8/1981 | Greve | 346/140 |
| 4,353,078 | 10/1982 | Lee | 346/140 |

*Primary Examiner*—Joseph W. Hartary
*Attorney, Agent, or Firm*—Laff, Whitesel, Conte & Saret

[57] ABSTRACT

A printer head, for an ink-on-demand type ink-jet printer, squirts ink droplets onto a printing medium. The printer head includes a nozzle for delivering the ink droplets and a passage for supplying ink from an ink tank. The ink is pressurized in accordance with an electric signal which commands the delivery of the ink droplets. Fluid control valves are deformed under the action of the ink pressure.

3 Claims, 27 Drawing Figures

PRINTER HEAD FOR AN INK-ON-DEMAND TYPE INK-JET PRINTER

This is a continuation of U.S. patent application Ser. No. 274,210, filed June 16, 1981, now abandoned.

This invention relates to a printer head for an ink-on-demand type ink-jet printer in which ink droplets are electromechanical transducer which is attached to one wall of an ink chamber.

Various types of ink-jet printers have been proposed as described in an article entitled "Ink Jet Printing", by Fred J. Kamphoefner published in the IEEE TRANSACTIONS ON ELECTRON DEVICES, Vol. Ed-19, No. 4, April 1972, pp. 584–593. The ink-jet printer of an ink-on-demand type is described in detail, for example, in the U.S. Pat. No. 3,946,398 entitled "METHOD AND APPARATUS FOR RECORDING WITH WRITING FLUIDS AND DROP PROJECTION MEANS THEREFOR" issued to E. L. Kyser, et al. and in the U.S. Pat. No. 4,106,032 entitled "APPARATUS FOR APPLYING LIQUID DROPLETS TO A SURFACE BY USING HIGH SPEED LAMINAR AIR FLOW TO ACCELERATE THE SAME" issued to M. Miura, et al.

The droplet forming operation in the conventional ink-on-demand type ink-jet printer has involved several problems, as stated hereunder. In the first place, the ink pressure generated by the deformation of the wall of the pressure chamber acts, not only on the nozzle portion, but also on the ink feed port, so that there is a large loss of energy which is dissipated otherwise than by the droplet formation. In order to squirt the ink droplets, accordingly, the volume change of the pressure chamber needs to be large which requires a high electric energy for the piezoelectric element. This has led to such problems as a degradation in the characteristics of piezoelectric element and a lowering of the response rate of the droplet formation.

Secondly, there has been the problem that, when the repetition period of the ink droplet formation is shortened, the volumes and flight speeds of the squirted ink droplets fluctuate. This is attributed to the fact that, while the meniscus is being returned into the nozzle by the change of the internal volume of the pressure chamber after the ink droplet formation, the next droplet-formation operation starts. The position and transfer speed of the meniscus at the starting of the operation change depends upon the repetition period. In order to suppress such fluctuations, the reverting speed of the meniscus retracted into the nozzle needs to be increased. Since, however, the reversion of the meniscus is dependent upon the surface tension of the ink and since the value of this surface tension is inherent in the ink material, it is subject to a limit. To increase the reverting speed of the meniscus, the surface tension must be great.

In the next place, there has been the problem that when the repetition period of the ink droplet formation is made still shorter, the volume of the ink droplet decreases, and the droplet formation eventually stops. This problem has been known to be also attributed to the limitation in the reverting speed of the meniscus as it is retracted into the nozzle.

In the prior art, accordingly, the number of ink droplets to be formed within one second or the ink droplet delivery frequency is at most 3 KHz, or so, in a practical range. The highest frequency with the fluctuations of the characteristics neglected is approximately 10 KHz.

The prior art has, therefore, been unsuitable for high-speed high-density printing.

U.S. Pat. 3,848,118 shows an ink-jet printer head with an ink passage on the ink feed side. This head is constructed of a fluidic element in order to enhance the energy efficiency at the droplet formation. The fluidic element has the effect that the flow resistance to an ink stream changes depending upon the direction of the ink stream, and it intends to enhance the energy efficiency at the droplet formation. However, the fluidic element attains a kind of rectification characteristic by utilizing physical properties inherent in fluids. There are problems such that this characteristic fluctuates, depending upon the nature of the fluid used. The ratio of the flow resistance changes responsive to the directions of the ink stream cannot be large. Moreover, the fluidic element has been structurally complicated and has been attended with much difficulty in disposing it within the ink-jet printer heads.

An object of this invention is to provide a novel ink-jet printer head which solves the various problems in the prior art.

According to this invention, a printer head for an ink-on-demand type ink-jet printer squirts ink droplets onto a printing medium. The printer head has a nozzle for squirting the ink droplets. A supply passage for ink is in communication with an ink tank. A pressure exertion means applies a pressure on the ink in accordance with an electric signal to squirt the ink droplets. Fluid control is by a valve which is deformed under the action of the ink pressure.

Other features and advantages of this invention will be apparent from the following description of preferred embodiments of this invention taken in conjunction with the accompanying drawings, wherein:

Figure 1:
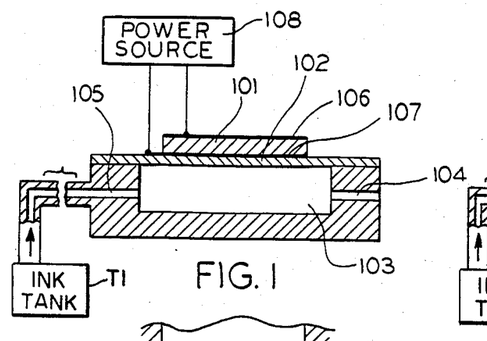
FIG. 1 is a cross sectional view of a conventional ink-jet printer head.

In the conventional ink-on-demand type ink-jet printer, as shown in FIG. 1, a nozzle 104 and an ink feed port 105 communicate with a pressure chamber 103, which is filled with ink and which generates a pressure pulse by deforming a wall 102 responsive to an electromechanical transducer means 101. The ink feed port 105 feeds the ink from an ink tank (T1) to the pressure chamber 103. When a pressure is not applied, a meniscus of ink formed at the end face of the nozzle 104 balances with the pressure of the ink, owing to the surface tension.

A piezoelectric element is mainly employed as the electromechanical transducer means 101. The piezoelectric element is fastened to the wall 102. When a driving voltage is applied across two electrodes 106 and 107, from a voltage source 108, an internal stress arises in the piezoelectric element 101 to deform and curve the wall 102.

The formation of an ink droplet is carried out. When the wall 102 is curved inwardly into the pressure chamber 103 responsive to a voltage applied to the piezoelectric element 101. The internal volume of the pressure chamber decreases. Ink within the pressure chamber is forced out of the pressure chamber. The ink pressure at this time squirts the ink from the nozzle 104. The ink pressure from the pressure chamber acts also on the ink feed port 105. Also, an ink stream returns from the ink feed port 105 to the ink tank when the wall curves inwardly.

Subsequently, when the voltage applied to the piezoelectric element 101 returns to zero or a voltage of the opposite polarity is applied to eliminate the deformation of the wall 102 of the pressure chamber or to curve the wall outwardly away from the pressure chamber, the internal volume of the pressure chamber increases, and the ink is drawn back into the pressure chamber. At this time, the ink is fed from the ink tank through intake port 105 and into the pressure chamber. Meanwhile, at the nozzle 104, the meniscus is retracted from the nozzle end into the nozzle.

Subsequently, after the volume fluctuation in the pressure chamber has stopped, the meniscus which was retracted into the nozzle reverts to the nozzle end again, under the action of the surface tension of the ink. With the transfer of the meniscus responsive to the increase of the internal volume of the pressure chamber, the ink feed from the ink tank is continued at the ink feed port 105. At the time when meniscus has reverted to the nozzle end and has come to a standstill, the supply from the ink previously squirted from the nozzle 104 finishes off.

Figure 2:
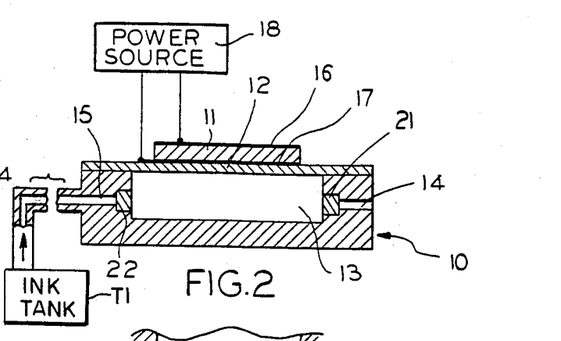
FIG. 2 is a cross sectional view of a first embodiment of this invention.

Refer to FIG. 2, the first embodiment of this invention which includes an ink-jet printer head 10, is constructed of a nozzle 14 for squirting ink, a supply passage 15 communicating with an ink tank (not shown) for supplying the ink, a pressure chamber 13 filled with the ink, and a piezoelectric element 11 fastened to a wall 12 of the pressure chamber. A first fluid control means 21 is disposed between the nozzle 14 and the pressure chamber 13. A second fluid control means 22 is disposed between the pressure chamber 13 and the supply passage 15. When the ink passes through the fluid control means, a pressure loss occurs. Herein, the ratio of the pressure loss to the flow rate of the ink (hereinafter, referred to as "flow resistance") changes, depending upon the directon of the passing ink stream. The fluid control means 21 and 22 operates so that the flow resistance may become low under the action of the pressure of the ink, in response to the ink stream in the direction from the supply passage side toward the nozzle side. Whereas, the flow resistance may become high under the action of the ink pressure, in response to the ink stream in the direction from the nozzle side toward the supply passage side.

Ink droplets are formed in the ink-jet printer head 10. The wall 12 is curved inwardly into the pressure chamber 13 by applying a voltage to the piezoelectric element 11, through electrodes 16 and 17 from a power source 18. The pressure owing to the curvature of wall 12 acts on the ink within the pressure chamber 13. As a result, the stream from the pressure chamber 13 toward the nozzle 14 acts on the first fluid control means 21 so as to make a low flow resistance low. The stream of the ink from the pressure chamber 13 toward the supply passage 15 acts on the second fluid control means 22 so as to make a high flow resistance.

Therefore, the difference between the two flow resistances becomes large. The ink is forced out of the pressure chamber flows, principally toward the nozzle side, and the ink droplet is squirted from the nozzle 14. Subsequently, when the voltage applied to the piezoelectric element 11 is returned to zero or to a voltage of the opposite polarity, the deformation of the wall 12 of the pressure chamber returns to null or to curve the wall outwardly away from the pressure chamber. The internal volume of the pressure chamber 13 increases and the pressure inside the pressure chamber 13 decreases. As a result, the stream from the nozzle 14 toward the pressure chamber 13 acts on the first fluid control means 21 to make the flow resistance high. Whereas, the ink stream from the supply passage 15 toward the pressure chamber 13 acts on the second fluid control means 22 to make the flow resistance low. In this case, accordingly, the ink flows principally from the supply passage 15 into the pressure chamber 13. There is a reduction in the extent to which the meniscus in the nozzle portion is retracted into the nozzle.

As is apparent from the droplet forming operation described above, in the ink-jet printer head 10, the deformation of the pressure chamber 13 acts for squirting the ink droplet when the volume of the pressure chamber decreases. It acts for supplying the ink when the volume to the pressure chamber increases. Therefore, the invention reduces the dissipation of energy onto the supply passage side, at the time when the ink droplet squirts, which occurs in the prior art. The energy efficiency is enhanced. Further, since the retraction of the meniscus into the nozzle at the ink supply lessens, the period of time required from the meniscus to revert to the nozzle end part is shortened. In addition, since the change of the internal volume of the pressure chamber by the piezoelectric element may be small, on the same order as the volume of the ink droplet, the period of time for forming the droplet can be shortened, in the extreme. Since excess electric energy need not be applied to the piezoelectric element, the degradations of the characteristics of the piezoelectric element does not occur. Further, in the prior art, the ink supply relies on the surface tension of the meniscus at the nozzle portion. The ink is supplied from the supply passage owing to the increase of the internal voluime of the pressure chamber. Hence, the prior art forcibly performs the ink supply function by the use of the external energy such as electric energy, so that the ink supply for the high-speed droplet formation is possible. Thus, the ink-jet printing apparatus, according to this invention, has realized the droplet formation at very high speed.

The example employing the two fluid control means has been described above. However, even when two fluid control means are not jointly used, the use of the means either between the pressure chamber and the nozzle or between the ink feed port and the pressure chamber is effective. If the pressure control means is located between the ink feed port and the pressure chamber, when the internal pressure of the pressure chamber is raised to extrude the ink, the ink flows out toward the nozzle portion and the supply passage. The fluid control means disposed on the supply passage side can be set so that the flow resistance may become greater than the flow resistance in the nozzle portion, under the action of the ink pressure. As a result, most of the ink extruded from the pressure chamber is squirted from the nozzle.

Subsequently, when the internal pressure of the pressure chamber is lowered to retract the ink into the pressure chamber, the ink flows into the pressure chamber from both the nozzle portion and the supply passage. At this time, the fluid control means located on the supply passage side operates so that the flow resistance may decrease. The flow resistance in the supply passage can be set to become less than that in the nozzle portion. As a result, most of the ink flows from the supply passage into the chamber. In this manner, there are different ratios between the flow resistances in the nozzle portion and the supply passage in case of the extrusion and retraction of the ink from and into the pressure chamber. The same effect as in the first embodiment can be brought forth.

A similar effect is also attained if the fluid control means is disposed between the pressure chamber and the nozzle. In this case, the flow resistance of the fluid control means is smaller under a high internal pressure than that under a low internal pressure. In order to intensify the effect of the fluid control means, it is desired to set the flow resistance of the fluid control means to be lower than the flow resistance of the ink supply passage when the internal pressure is high, and to be higher than that of the ink supply passage when the internal pressure is low.

There is a pulsing stream of the ink in the on-demand type ink-jet printer head. The quantity of the ink which is passed through a valve by one pulsation of the stream is extremely small, approximately equal to the volume of one droplet, at most. On the other hand, in order to enhance the rectification effect based on the operation of the valve, it is important that the volume of the space in which the valve moves should be sufficiently smaller than the quantity of the ink to pass through the valve.

Figure 3A:
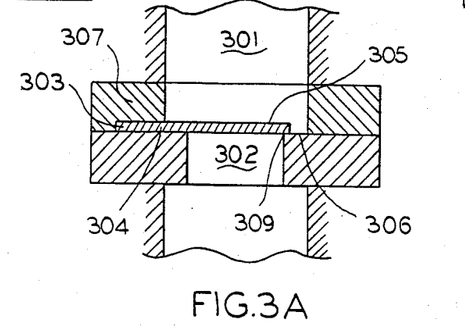
FIGS. 3A, 3B, 4A, 4B, 4C, 5A, 5B, 5C, 6A, 6B, 6C, 7A, 7B, 9A, 9B, 9C and 10 show various examples of a fluid control means used in the first embodiment.
Figure 3B:
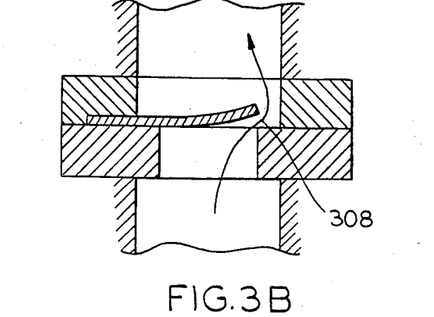

FIGS. 3A and 3B show the first example of the fluid control means. A flat valve 305 is made of an elastic member and is arranged to cover an ink outflow port 302. The valve 305 is fixed in close contact with a valve seat 304 by means of a stationary portion 303. In the absence of the stream of ink, also a tip of a movable portion 305 lies in close contact with a valve seat 306. Now, when pressure causes the ink to flow upwardly from below the valve, as shown by an arrow in FIG. 3B, the valve 301 is pushed up and the ink flows out through the opening 308 between the valve and the valve seat. Since the pressure loss at this time occurs mostly in the opening 308, the dimension of the overlap parts 309 of the valve and the valve seat needs to be made small so as to reduce the pressure loss. The material of the valve can be thin films of metals such as gold, nickel and stainless steel and various plastic films. For example, in case of a polyethylene terephthalate film, the movable portion 305 and the outflow port 302 of the valve are respectively square, with each side being 200 μm long and 180 μm long. The length of the overlap part 309 is then 10 μm. The valve is formed by a punching from a polyethylene terephthalate film which is 20 μm thick. The valve is fixed in such manner that the stationary portion 303 is pressed against the valve seat 304 by a fixing member 307.

The wall 12 of the pressure chamber 13 is made of a cold-rolled stainless steel plate 0.4 mm thick. The piezoelectric transducer may be made of NEPEC N-10, having dimensions of 2 mm×0.4 mm. The piezoelectric transducer is fastened to the wall 12 with an epoxy type solventless thermosetting binder. The nozzle 14 may be a hole which is 50 μm in diameter and 100 μm in length which is formed by electric discharge machining.

The droplet formation is carried out by supplying a pulse voltage to the piezoelectric transducer with a waveform corresponding to one wavelength of the cosine wave. As a result, the formation of an ink droplet having a diameter of about 100 μm and an initial velocity of about 2.4 m/sec is observed at a pulse width of 55 sec and a peak voltage of 80 V. When the frequencies or repetition rate of the pulses is changed, 18 KHz is the maximum operating frequencies, at which the fluctuations of the initial velocity of the droplet fall within 10%. In addition, in case where the fluid control means is dispoed on only either the nozzle side or the supply passage side, the operating frequency is about 12 KHz, under the operating conditions mentioned above. On the other hand, if the ink-jet printer head of the same geometry is used without providing the fluid control means, the operating frequency for fulfilling the droplet velocity fluctuations of within 10% is, at most, only about 1.5 KHz. In order to form an ink droplet having a diameter of 100 μm, a peak voltage of about 9 V is necessary, and the initial droplet velocity is about 1.8 m/sec. From these results, it is apparent that the fluid control means, according to this invention, is very effective for raising the operating speed of the ink jet, and that it is effective for enhancing the energy efficiency in the droplet formation.

It is advantageous for an assembly of the printing head to make the geometry of the valve as large as possible. In this case, however, the geometry must be limited to the range in which the volume of the moving space of the valve is smaller than the volume of the droplet. In addition, as the valve enlarges, also its thickness needs to be increased. For example, when the sides of a square valve made of polyethylene terephthalate are enlarged to 300 μm and 400 μm, the thickness of the valve side needed to be made 35 μm and 75 μm, respectively. It has been confirmed that when the dimensions of the valve are further enlarged, the effectiveness of the valve lowers abruptly.

The fluid control means in this invention has its one feature in exploiting the displacement of the valve owing to the ink pressure. In order to hold a high reliability of the valve, the displacement of the valve needs to be made within the elastic limit thereof. In case where the valve is displaced beyond the elastic limit, it is deformed and cannot return to its original closed state. With the cantilever valve as in the first example shown in FIG. 3, there is a narrow pressure range in which the elastic limit is not exceeded. Therefore, it has sometimes been the case that an excess ink pressure deforms the valve at, for example, the initial charging of the ink-jet printer head with ink.

Figures 4A, 4B:
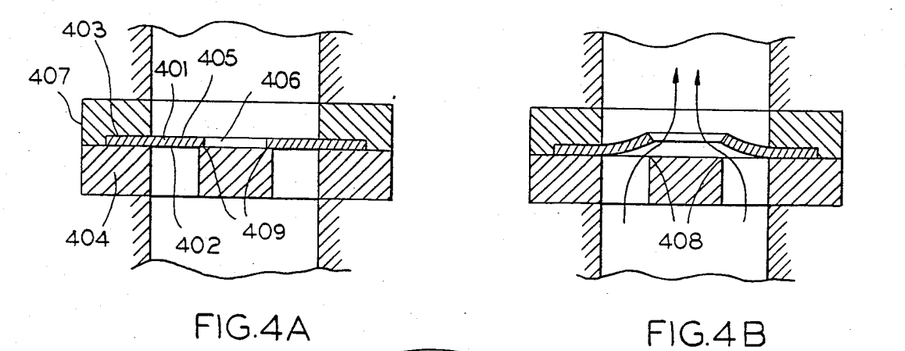
Figure 4C:
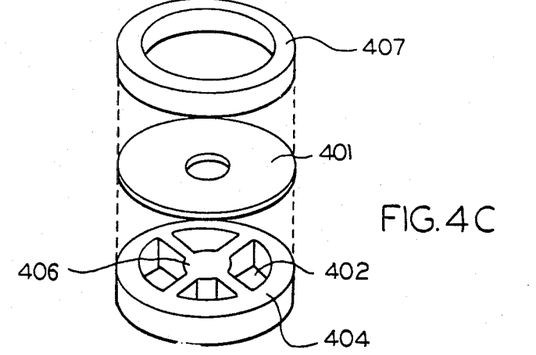

Referring to FIGS. 4A and 4B, a doughnut-shaped disc valve 401, made of an elastic member, is fixed in close contact with a valve seat 404 by a stationary portion 403. In the absence of the stream of the ink, also a movable portion 405 lies in close contact with a valve seat 406 so as to blockade an ink outflow port 402. Such a valve is constructed of components as shown in FIG. 4C. More specifically, the valve seats 404 and 406 are unitarily formed to have the annular outflow port 402 therebetween. The disc valve 401 is formed with a hole in its central part and is stacked on the valve seats. A ring-shaped fixing member 407 is further stacked on the valve, to fix the valve.

When pressure causes the ink to flow upwardly and act on the valve, the valve 401 is pushed up similarly to the cantilever valve in FIG. 3. The ink flows out through the opening 408 between the valve and the valve seats as shown in FIG. 4B. The deformation of the disc valve around the central hold thereof, as in FIG. 4B, includes an elongation in the circumferential direction of the central hole in addition to the same simple bending in the radial direction as in the cantilever valve of FIG. 3. Accordingly, the disc valve is more difficult to deform than the cantilever valve and has its durability sharply enhanced against the action of intense pressure.

An example of the geometry of the fluid control means constructed by the use of a polyethylene terephthalate film will be given below. The doughnut-shaped disc valve 401 is formed by a punching from the polyethylene terephthalate film 20 $\mu$m thick. The diameter of the central hole is set at 300 $\mu$m, and the outside diameter of the movable portion 405 of the valve 401 is set at 500 $\mu$m. The outside diameter of the valve seat 406 is set at 320 $\mu$m so that the length of the overlap parts 409 of the movable portion 405 and the valve seat 406 may become 10 $\mu$m. The fluid control means thus constructed is applied to the ink-jet printer head 10 shown in FIG. 2. As a result, the same effects as in the fluid control means shown in FIG. 3 has been confirmed.

If a gold foil is used as the material of the disc valve 401, the thickness of the valve needed to be as small as 5 $\mu$m when the diameter of the central hole and the oustide diameter of the movable portion of the disc valve are set equal to those in the embodiment using polyethylene terephthalate film. In fabricating such a thin disc valve, various microscopic machining techniques have been known. For example, according to the machining technique called "electroforming", an electrode in the flat shape of the disc valve is plated with gold up to a predetermined thickness in the vertical direction, whereby the disc valve of the gold foil can be formed.

The thickness of the valve must be made smaller as the elastic modulus of the material used becomes greater. For example, in the case where the disc valve having the same geometry as those of the disc valve of the gold foil is made of stainless steel, the pressure for the droplet formation needs to be approximately double that in the case of the gold foil. In order to perform the droplet formation under the same conditions, accordingly, the thickness of the stainless steel valve needs to be made smaller than 5 $\mu$m. The thin valve, however, has such problems that the handling is difficult and that thin foils are difficult to obtain in case of some materials.

Figure 5A:
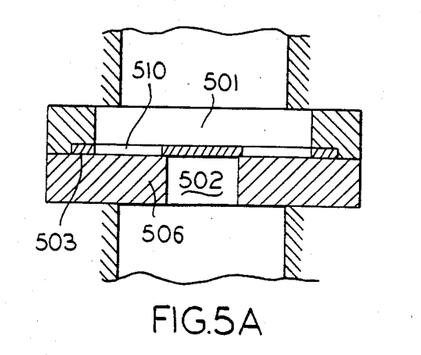
Figure 5B:
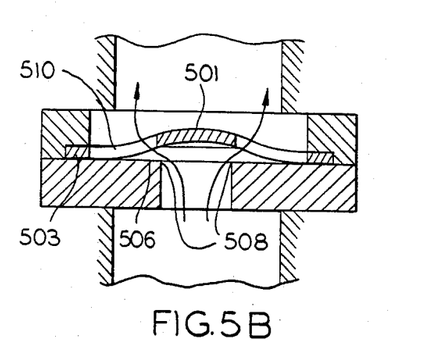

Referring to FIG. 5A and 5B, in the third example of the fluid control means, a valve 501 is arranged in close contact with a valve seat 506 so as to cover an outflow port 502. Valve 501 is supported by fine supporting arms 510, and is fixed to the valve seat 506 by a stationary portion 503.

Figure 5C:
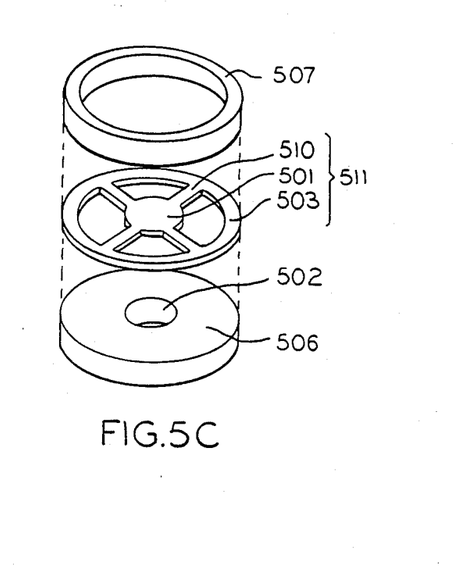

As understood from FIG. 5C, the third example can be constructed by successively stacking various parts. The valve seat 506 has the outflow port 502 in its central part. A valve member 511 is centrally located and the valve 501 covers the outflow port unitarily with the peripheral stationary ring 503, through the fine supporting arm 510. A fixing member 507 secures the parts in place.

In response to the upward stream of the ink, the valve 501 is pushed up as shown in FIG. 5B and the ink flows out through the opening 508 between the valve and the valve seat 506. In the third example, the operation of the valve involves the flexures and elongation of the supporters 510. The valve has its durability sharply enhanced against the action of intense pressure in comparison with the cantilever valve of FIG. 3. Moreover, since the displacement of the valve is based on the deformation of the supporter portion, the quantity of the displacement of the valve can be larger than in the disc valve of FIG. 4, resulting in the advantage that the versatility of the selection of the valve material and the versatility of the design are sharply enhanced.

An example of the geometry in the case where a stainless steel sheet of 10 $\mu$m thick is used will be given below. In case of the configuration in which the disc valve 501 has four supporting arms 510 which are similar to the valve member 511 shown in FIG. 5C, the outside diameter of the disc valve 501 is 200 $\mu$m, the width and length of the supporting arm are respectively 50 $\mu$m and 400 $\mu$m, the diameter of the ink outflow port 502 is 180 $\mu$m, and the length of the overlap parts of the disc valve 501 and the valve seat 506 is 10 $\mu$m. The fluid control means thus constructed may be applied to the ink-jet printer head shown in FIG. 2. As a result, the same effects as in the fluid control means shown in FIGS. 3 and 4 has been confirmed. This example is highly practical because of the additional advantages that stainless steel is readily available and can be used with large outside dimensions.

While, in any of the fluid control means thus far described, the movable portion of the valve is arranged so as to lie in close contact with the valve seat at a standstill, such close-contact arrangement is not always necessary.

Figure 6A:
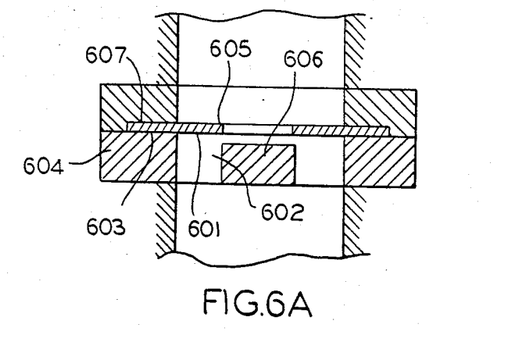
Figure 6B:
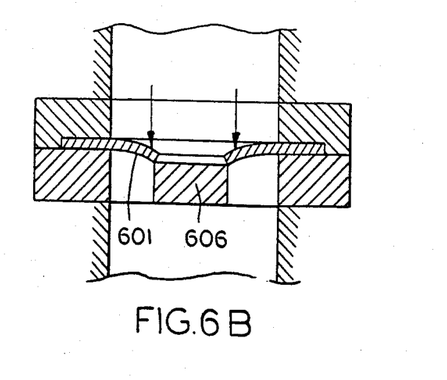

Referring to FIGS. 6A and 6B, in the fourth example of the fluid control means, a disc valve 601 is fixed in close contact with a valve seat 604 by a stationary portion 603. In the absence of the stream of the ink, a movable portion 605 lies in a position which is separate from a valve seat 606. The ink chambers on the opposite sides of the valve are normally in communication with each other. However, when a pressure acts to cause the ink to flow downwardly, as shown in FIG. 6B, the valve 601 flexes and comes into contact with the valve seat 606, to prevent a flow of the stream of the ink.

Figure 6C:
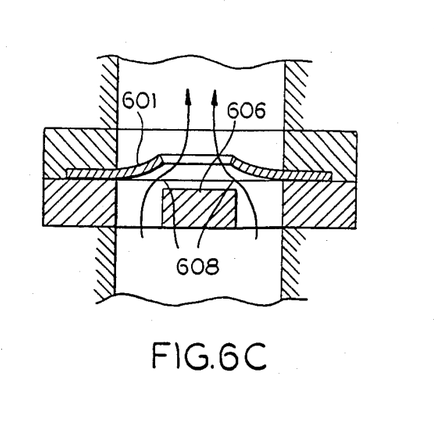

On the other hand, under the action of a pressure causing the ink to flow upwardly as shown in FIG. 6C, the valve 601 flexes upwardly and the ink flows upwardly through the opening 608, between the valve and the valve seat. In this manner, to attain the rectification effect of permitting the ink to flow in one direction, it is not always necessary that the valve and the valve seat lie in close contact while at a standstill position.

In an embodiment employing a doughnut-shaped disc valve which has been actually made of a polyethylene terephthalate film 20 $\mu$m thick, the diameter of the central hole is 300 $\mu$m and the outside diameter of the movable portion is 500 $\mu$m. The quantity of the flexure of the valve under the ordinary droplet-forming conditions is readily calculated within the scope of the fundamental knowledge of the material strength and is found to be approximately 3 $\mu$m. A stationary rectification effect is accordingly achieved when the spacing between the valve and the valve seat at the standstill is up to 3 $\mu$m or so. Needless to say, the fact that the valve and the valve seat need not always lie in close contact at the standstill is applicable, not only to the embodiment employing the doughnut-shaped disc valves, but also to the fluid control means shown in FIGS. 3 and 5.

In the fourth example, if the spacing between the valve and the valve seat at the standstill is increased beyond the flexure excursion of the valve, the ink comes to flow also in the opposite direction, and the rectificaton effect weakens gradually. However, in a range in which the spacing between the valve and the valve seat is not very great as compared with the flexure excursion of the valve, the flow resistance can be greatly changed depending upon the direction of the ink stream. Hence, a satisfactory function can be exercised as the fluid control means.

There are considered, as the flow resistance, an inertial resistance and a viscous resistance which are based on the ink stream, and a loss term in the part in which the sectional shape of the flow passage changes. The viscous resistance is the greatest, with respect to the steady flow, after the valve has flexed a fixed amount. As a basic characteristic concerning viscous fluids, it has been known that the viscous resistance is proportional to $d^{-3}$ with respect to the spacing d between the valve and the valve seat. Accordingly, in a case where, for example, the spacing between the valve and the valve seat at the standstill is 8 $\mu$m for a valve flexure quantity of 3 $\mu$m, the flow resistance changes about ten times in dependence on the direction of the ink flow, and a satisfactory function can be achieved as the fluid control means. In the fluid control means thus far described, the ink stream in the opposite direction is not perfectly cut off, but the flow resistance changes greatly in dependence on the direction of the ink stream. The valve is readily made in such a way that the spacing between the valve and the valve seat in each of the embodiments shown in FIGS. 3, 4 and 5 is greater than the flexure excursion of the valve.

The above-mentioned structures in which the valve and the valve seat are separated at the standstill have an important advantage from the viewpoint of a practical use. At the standstill, the ink meniscus is formed at the end face of the nozzle of the ink-jet printer head. A liquid component in the ink in the nozzle portion is continually vaporizing. If the fluid control means is disposed between the pressure chamber and the supply passage and if the ink passages before and behind the fluid control means are separated from each other by the valve, the ink in the nozzle decreases and the meniscus is retracted into the nozzle. When the retraction of the meniscus arrives at the pressure chamber, the air is introduced into the pressure chamber, and a stable droplet formation can no longer be executed. In contrast, when the ink passage parts before and behind the fluid control means are communicating, even at the standstill, the ink is supplied from the supply passage side to the extent that the ink in the nozzle portion has decreased due to the vaporization of the liquid component, and hence, the ink meniscus is always kept at the nozzle end face.

Figure 7A:
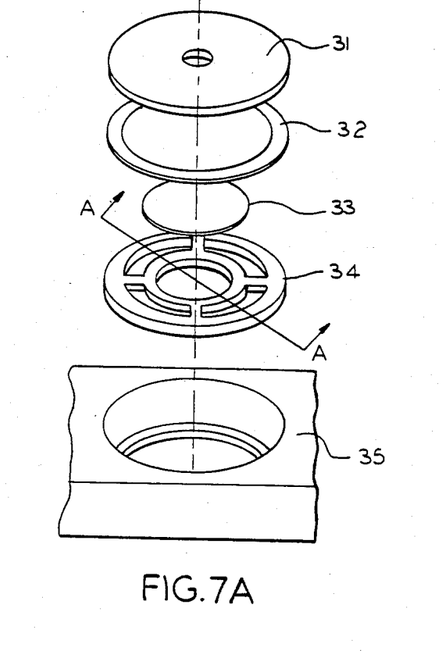
Figure 7B:
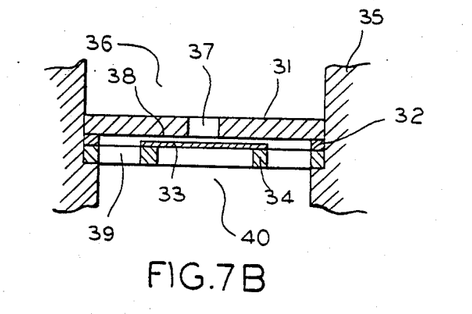

As the fluid control means whose flow resistance changes depending upon the direction of the ink stream, there will now be described one embodiment having a valve structure somewhat different from those of the examples described above. The fifth embodiment of the fluid control means shown in FIGS. 7A and 7B is constructed of a wall member 35 defining a flow passage for the ink. A plate member 31 is provided with an aperture, a spacer 32, a film 33 which can be deformed by the pressure of the ink, and a frame member 34 which has a frame for securing the film and whose outer side is a penetration portion. The bore of the plate member 31 is made smaller than the diameter of the film. The film 33 may be made of sheets of metals such as gold and stainless steel, films of plastics, etc. The ink flows from the passage 36 to the passage 40 through the aperture 37, the opening 38 between the plate member 31 and the film 33, and the penetration portion 39 of the frame member 34. When the ink flows from the passage 40 to the passage 36, it passes in the reverse order.

The operation will now be described. When the pressure on the side of the passage 36 becomes higher than the pressure on the side of the passage 40, the ink begins to move from the passage 36 toward the passage 40. Letting $P_1$, $P_2$, $P_3$ and $P_4$ denote respective pressure in or on the passage 36, the surface of the film 33 facing the aperture 37, the penetration portion 39 and the passage 40, the relationship among the pressures when the ink begins to move is represented by $$P_1 > P_2 > P_3 > P_4$$

Therefore, a pressure difference of $(P_2 - P_4)$ arises between both the surfaces of the film 33, and the film curves downward. Therefore, the gap width of the opening enlarges, and the flow resistance of this part decreases. For this reason, when the ink flows from the passage 36 toward the passage 40, the overall flow resistance of this flow passage decreases.

In contrast, when the pressure of the passage 40 is higher than the pressure in passage 36 and the ink flows in the opposite direction, the relationship of the pressures of the respective portions becomes $$P_1 < P_2 < P_3 < P_4$$

Therefore, the film 33 curves upwardly, conversely to the foregoing, the gap width of the opening 38 decreases and the flow resistance increases. For this reason, the overall flow resistance of the flow passage increases. For this reason, the overall flow resistance of the flow passage increases. Thus, the flow passage has a flow resistance which changes depending upon the direction of the ink stream. A high-speed ink-jet printer head may be provided by employing it as the fluid control means.

In order to intensify the effects by making a great change of the flow resistance dependent upon the direction of the ink stream, it is desirable for a nearly unity (1:1) ratio $k = d_2/d_1$ between the gap width $d_1$ of the opening 38 and the width $d_2$ of the deformation of film 33. The magnitude of the ratio between the flow rates is dependent upon the direction of the stream. The ratio becomes $$\left( \frac{1 + k}{1 - k} \right)^3$$

under an identical pressure. For example, if the material of the film is polyethylene terephthlate 10 $\mu$m thick, the diameter of the film is 400 $\mu$m, and the gap width of the opening 38 is 10 $\mu$m. Then, supposing the pressure difference between the front and rear of the film is 0.5 atmosphere, $k = 0.5$ is obtained and the ratio of the flow rates becomes about 60.

Figure 8:
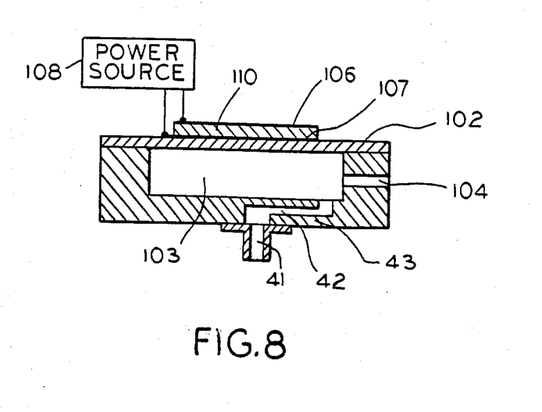
FIG. 8 is a cross sectional view of a second embodiment of this invention.

Referring to FIG. 8, in the second embodiment of this invention, the fluid control means is arranged between the ink feed port and the pressure chamber in the conventional ink-jet printer head shown in FIG. 1. As the fluid control means, a passage 42 having a fixed gap width is disposed between an ink feed port 41 and a pressure chamber 103. The wall of the passage on one side is provided with a hole communicating with the pressure chamber, and a film 43 is fastened to a part of the passage 42. As the film, the sheet of a metal, plastic or the like can be employed as mentioned above.

In operation, when a voltage is applied to a piezoelectric element 101 to curve the wall 102 of the pressure chamber 103 inwardly, internal pressure of the pressure chamber rises. Then, the film 43 curves outwardly to reduce the gap width of the passage 42. Therefore, the flow resistance of the passage 42 increase, and most of the ink extruded from the pressure chamber is squirted from the nozzle 104. Subsequently, when the voltage is restored to its original value, the curvature of wall 102 undergoes a force which restores it to its original position, and hence, the pressure of the pressure chamber becomes lower than the external pressure. Therefore, the film 43 curves onto the pressure chamber side, conversely to the foregoing, and the flow resistance of the passage 42 decreases. For this reason, most of the ink to flow into the pressure chamber is applied through the passage 42. Accordingly, the quantity of the retracted ink is smaller than the quantity of the squirted ink in the nozzle portion. The period of time during which the retracted meniscus returns to the nozzle end is shortened, and this causes a shortened period for the ink droplet formation.

Figure 9A:
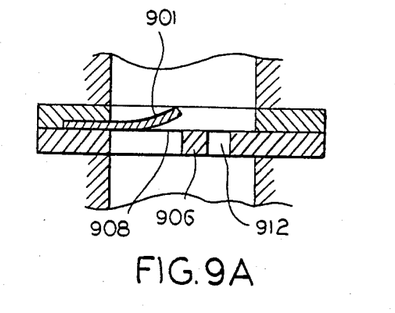
Figure 9B:
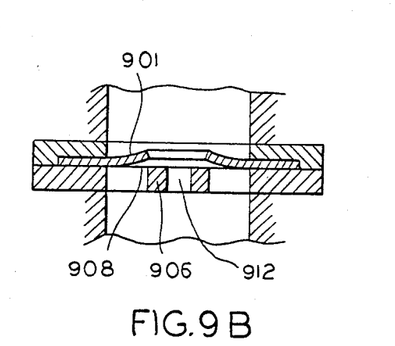
Figure 9C:
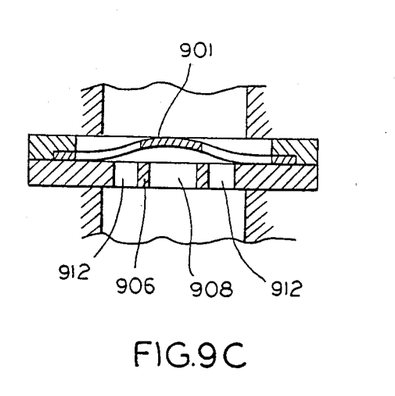

In each of the various examples of the fluid control means, as stated above, the flow resistance changed depending upon the directon of the ink stream. The change of the flow resistance is the sum of the fixed value independent of the direction of the ink stream and a value varying under the action of the valve. Accordingly, the flow resistance can also be changed in dependence on the direction of the ink stream in such a way that an auxiliary ink passage having a fixed flow resistance is disposed jointly with the fluid control means which has previously been illustrated in FIGS. 3, 4 and 5 and which has the complete rectification action. For example, FIG. 9 shows another example of the fluid control means in which an auxiliary ink passage penetrates at all times. The three parts of FIG. 9 respectively provide the valve seats in the three kinds of fluid control means shown in FIGS. 3, 4 and 5. FIG. 9 shows a case where the valve is open under the action of the ink pressure and where the ink is flowing upwardly. In order for such fluid control means to exercise a satisfactory function in the ink-jet head, the flow resistance to the ink passing through opening 908 between a valve 901 and a valve seat 906 needs to become sufficiently lower than the flow resistance of the auxiliary ink passage 912.

Figures 10, 11, 12:
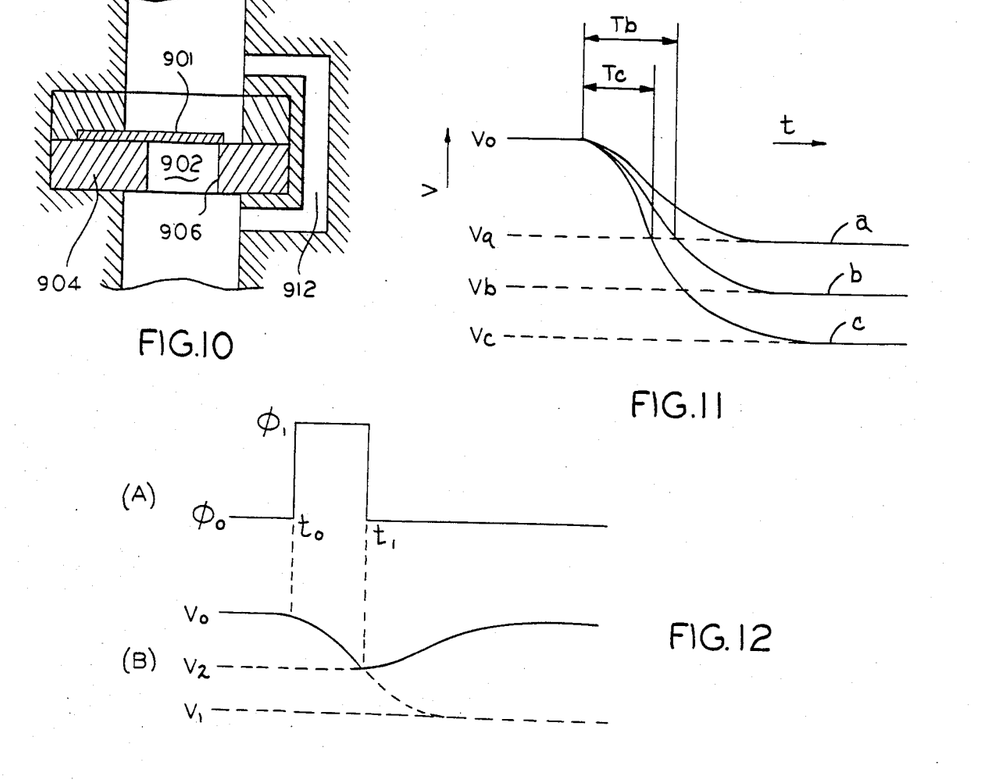
FIGS. 11 and 12 are diagrams which are useful for explaining the operation of the ink-jet printer head.

Still another example of the fluid control means is shown in FIG. 10, in which the parts of the ink passage covered by the valve and the valve seat, as shown in FIGS. 3, 4 and 5 are in communication via an auxiliary passage which is provided to bypass the valve and the valve seat. In this case, the flow resistance to the ink passing through the opening 908 between the valve 901 and the valve seat 906 needs to be sufficiently lower than the flow resistance of the auxiliary ink passage 912.

The driving voltage to be applied to the piezoelectric transducer 11 or 101 will be described. When the driving voltage is applied to the piezoelectric transducer, a pressure is generated in accordance with its voltage value $\phi$ or with a quantity of deflection. The magnitude of the pressure can be approximated as follows:

$$P = A(\phi - \phi_o) + B(V - V_o) \quad (1)$$

Here, A and B are constants that are determined by the dimension and material of the piezoelectric oscillation plate, P is the pressure, $\phi$ is the voltage, $\phi_o$ is the initial voltage, V is the capacity of the pressure chamber and $V_o$ is the capacity of the pressure chamber when $\phi = \phi_2$ and P=0.

As can be understood from the equation (1), the pressure occurring on the piezoelectric oscillation plate increases in proportion to the amplitude $(\phi - \phi_o)$ of the impressed voltage. When the voltage is applied to the piezoelectric oscillation plate, the pressure occurs in accordance with the equation (1) and the ink flows out the pressure chamber. As the capacity of this pressure chamber decreases, the pressure also decreases progressively and when a predetermined voltage $\phi_a$ is being applied, the pressure approaches zero. In this instance, the capacity of the pressure chamber progressively approaches the saturation value Va (P=0).

The behavior of the capacity change in this case is shown in FIG. 11A. In the drawing, symbols b and c represent the behavior when other voltages $\phi_b$ and $\phi_c$ are applied, respectively. Incidentally, the relationship between these voltages is $\phi_a < \phi_b < \phi_c$. It can be understood from this drawing that the deflection quantity of the capacity becomes greater with an increasing amplitude of the voltage. It can also be understood that the time required for deflection can be shortened by increasing the amplitude of the voltage if a predetermined capacity change is to be effected by this oscillation plate.

First, assume that the capacity is to be changed from $V_o$ to $V_a$. As shown in FIG. 11, when $\phi_a$ is impressed, the time required for deflection theoretically becomes infinite. When the voltage increases to $\phi_b$ and then to $\phi_c$, the time required for deflection becomes shorter to $T_b$ and $T_c$, respectively.

Next, deflection will be considered when a pulse voltage is applied to this piezoelectric oscillation plate. The width of this driving pulse is related to an ink droplet formation characteristic. In the ink jet head shown in FIG. 2, the behavior of the droplet formation will be considered by changing the width of the driving pulse. In this case, when the pulse width becomes greater and exceeds a predetermined width, the volume and initial speed of the ink droplet become constant irrespective of the pulse width. This is because the deflection of the pressure chamber reaches the saturation value (e.g. $V_a$) in FIG. 11 and thereafter a continued pulse width contributes nothing more. However, in this very large pulse width, a large number of sub-droplets, that are called "satellite", of ink are formed in addition to the main ink droplet and the satellite droplets cause recording problems. Furthermore, the time required for the deflection to attain its maximum becomes about 0.2 msec in ordinarily available ink jet recording heads in this large pulse width. In other words, if such a pulse width is employed, it is not possible to obtain a high ink droplet-forming frequency.

Accordingly, a practical driving pulse is one that shortens the application time and finishes the pulse application before the deflection attains its maximum. By a use of such a pulse, the formation of the satellites can be eliminated, and the repetition frequency of the driving pulse can be enhanced since the pulse width is narrow.

FIG. 12B shows the behavior of the change in the capacity of the pressure chamber when the driving pulse has a pulse width, at which the capacity of the pressure chamber does not attain the maximum deflection quantity, such as shown in FIG. 12A. In this drawing, $V_o$ represents the initial capacity and $V_1$ represents the saturation value when the drive pulse voltage $\phi_1$ is impressed. When the impressed voltage reaches $\phi_1$ from $\phi_o$, the capacity of the pressure chamber changes to asymptotically approach the saturation value $V_1$ and becomes $V_2$ at the time $t_1$ at the end of the $\phi_1$ voltage application. The deflection quantity of the pressure chamber capacity from $V_o$ is smaller than the deflection quantity up to the saturation value $V_1$.

Next, when the impressed voltage is required to $\phi_o$, the capcity of the pressure chamber changes from $V_2$ to asymptotically approach the saturation value $V_o$, when the voltage $\phi_o$ is impressed. The time during which the pulse is impressed will be compared with the time required from the capacity of the pressure chamber to return to $V_o$, after the end of the pulse application. The relationship between the time required for a predetermined deflection and the impressed voltage has already been described with reference to FIG. 11. Since the saturation is not yet attained, the deflection when the impressed voltage rises from $\phi_o$ to $\phi_1$ corresponds to the case when the capacity of the pressure chamber changes from $V_o$ to $V_a$ as $\phi_b$ or $\phi_c$ is impressed, as shown in FIG. 11. On the other hand, when the voltage is returned from voltage $\phi_o$ to $\phi_1$, the behavior corresponds to that when a is impressed in FIG. 11 because the capacity of the pressure chamber moves from $V_2$ and asymptotically approaches $V_o$ at the voltage $\phi_o$.

Accordingly, it can be understood that the voltage changes from $\phi_o$ to $\phi_1$. Thereafter, the time required for the pressure chamber capacity to return from $V_2$ to $V_o$, when the voltage is returned from $\phi_1$ to $\phi_o$, becomes greater than the time required for the change from $V_o$ to $V_1$. If the ink droplet is formed by a use of such a driving waveform, as shown in FIG. 12A, its repetition frequency becomes high. If the application time of the driving pulse and the repetition frequency approach each other, a succeeding voltage pulse is applied before the deflection of the pressure chamber returns its initial value $V_o$.

If there is any initial deflection as given by the aforementioned equation (1), when the succeeding voltage pulse is applied, the pressure generated by the pressure chamber becomes smaller, even if the same voltage is impressed. For this reason, the velocity of the jetted ink droplet and the volume of the droplet decrease. The decreases in the ink droplet velocity and the ink droplet volume may presumably be attributed to the slow action of the pressure chamber capacity in returning to its initial value. On the basis of this assumption, the present invention contemplates enhancing the ink droplet forming frequency by making it possible for the capacity of the pressure chamber to return to its initial value within a shorter period of time.

Figure 13:
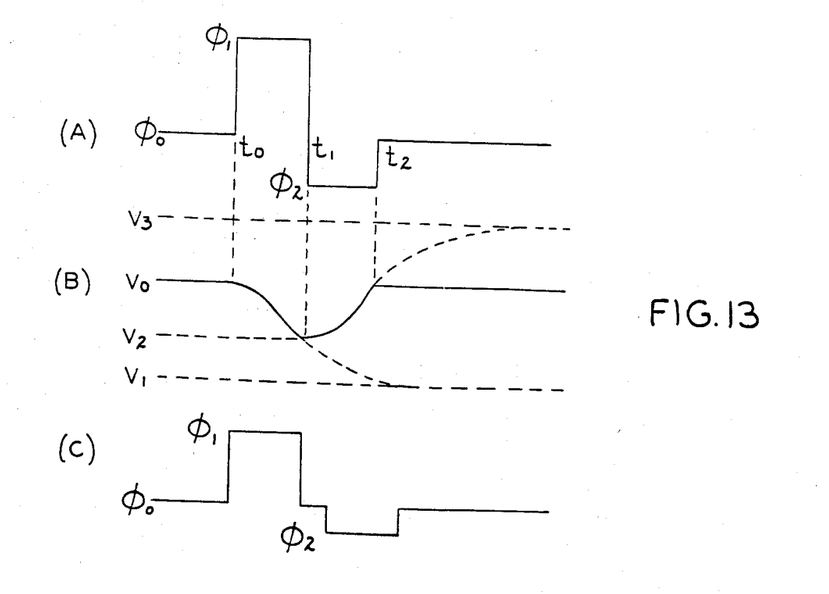
FIGS. 13, 14 and 16 are diagrams showing examples of the driving voltage to be applied to the ink-jet printer head, change in the pressure, and the change in the capacity of the pressure chamber.

FIG. 13A shows an example of the driving pulse in accordance with the present invention. The waveform is arranged so that it first changes from $\phi_o$ to $\phi_1$ at the time of the jetting of the ink. When the deflection of the pressure chamber is to be returned to its initial state, it is set to $\phi_2$, an amplitude in the direction opposite to $\phi_1$, with respect to $\phi_o$, before the voltage is returned to $\phi_o$. Then, the voltage is allowed to return to $\phi_o$. The mode of change in the capacity of the pressure chamber when this driving waveform is applied is shown in FIG. 13B. As the impressed voltage changes from $\phi_o$ to $\phi_1$ and attains the stage in which the ink droplet is about to be jetted, the capacity of the pressure chamber exhibits the same change as in FIG. 12B.

Next, when the impressed voltage changes from $\phi_1$ to $\phi_2$, a pressure is generated. This pressure is greater than one which occurs when the impressed voltage changes from $\phi_1$ to $\phi_o$. Accordingly, the capacity of the pressure chamber changes to move from $V_2$ and asymptotically approach $V_3$ which is greater than the initial value $V_o$. This is the same mode of change which occurs when the pressure chamber capacity changes with a varying application of voltages in FIG. 11. Hence, the capacity of the pressure chamber reaches the initial value $V_o$ more quickly than it does when the voltage is simply returned to $\phi_o$.

The impressed voltage is returned from $\phi_2$ to $\phi_o$ when the capacity of the pressure chamber reaches $V_o$. The application time of voltage $\phi_2$, in this description, is the time required for the pressure chamber capacity to return to $V_o$. Some increases or decreases of the application time may be effected in practice, in consideration of the force of inertia of the ink or the like. This application time of voltage $\phi_2$ varies in accordance with the magnitude of $|\phi_1 - \phi_2|$. When this absolute value is great, the application time becomes short. It becomes greater as the value $|\phi_1 - \phi_2|$ is small and asymptotically approaches $|\phi_1 - \phi_o|$, as can be appreciated from the explanation with reference to FIG. 11.

The driving waveform shown in FIG. 13A consists of two pulses continuously combined with each other. The first pulse is provided for forming the ink droplet and the second pulse shortens the returning time of the capacity of the pressure chamber. However, other driving waveforms may be employed, as well, such as one consisting of two spaced-apart pulses as shown in FIG. 13C.

The foregoing embodiment uses a rectangular driving waveform for the ease of description; however, the present invention is not limited in particular to such a waveform. It is possible to use a waveform in which a predetermined time constant is applied to the rise and fall of the pulse, a triangular wave, a sine wave, a trapezoidal wave, and so forth. After the voltage for jetting the ink droplet is applied, the voltage is not merely returned to its initial value $\phi_o$. A voltage, having an amplitude in the directon opposite to the voltage pulse for jetting the droplet, is applied to the initial potential $\phi_o$ so that the capacity of the pressure chamber is capable of more rapidly returning to its initial value $V_o$. Hence, the waveform for this purpose is not limitative, in particular.

Figure 14:
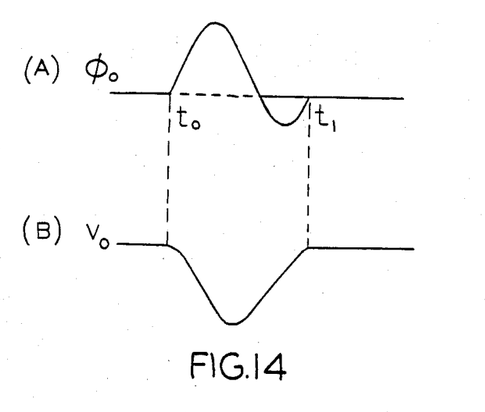

It is possible to use, for example, one period of a sine wave as the driving waveform, such as shown in FIG. 14A. In this waveform, the phase of the sine wave is adjusted so that when one period of the driving waveform finishes, the capacity of the pressure chamber returns to its initial value $V_o$, as shown in FIG. 14B. In this waveform, too, the capacity of the pressure chamber returns to its initial state more rapidly than a waveform which is devoid of such a voltage that is lower than $\phi_o$ and is applied to the above-mentioned waveform.

Figure 15:
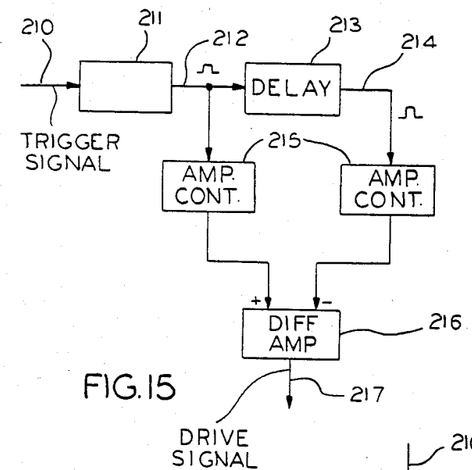
FIGS. 15 and 17 are block diagrams of the driving voltage forming means.

The driving waveform in accordance with the present invention can be synthesized by generally known methods. FIG. 15 shows a representative circuit for forming the driving waveform, such as shown in FIG. 13A. In the drawing, when a trigger pulse, for forming the ink droplet, is applied to a mono-multiple vibrator 211, a rectangular pulse is produced at output 212. This pulse width determines the $\phi_1$ application time of the driving pulse. The pulse at output 212 is applied to a second mono-multivibrator 213, which is triggered by the rear end of the pulse to generate a rectangular pulse at output 214. The pulse width of this pulse determines the $\phi_2$ application time of the driving pulse. The amplitudes of rectangular pulses at 212 and 214 are adjusted by an amplitude control circuit 215. The adjusted amplitude pulses are then applied to positive and negative input terminals of a differential amplifier 216, thereby yielding a driving signal at output 217.

Figure 16:
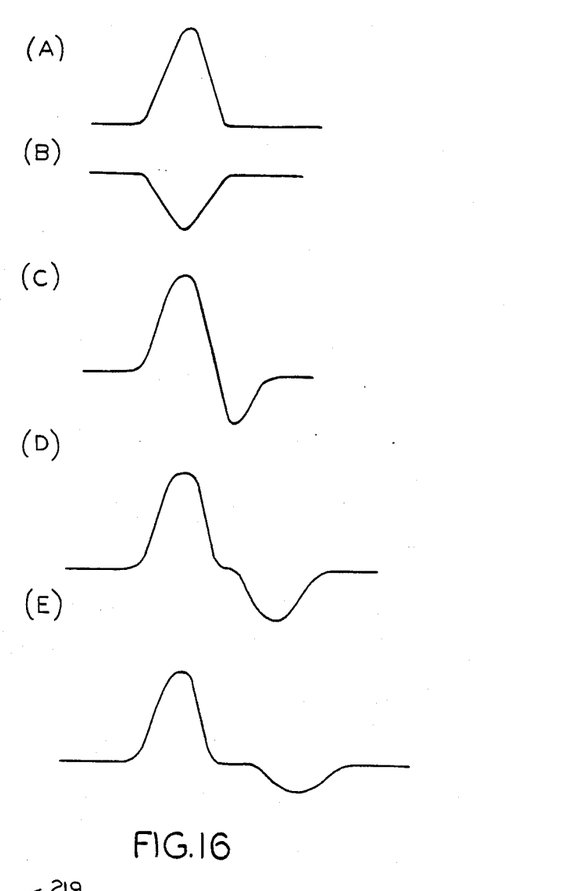

Another driving waveform in accordance with the present invention will be described next. FIG. 16A shows an example of the driving waveform and FIG. 16B shows an example of a compensating waveform. Driving waveforms of the present invention are synthesized from these waveforms, as shown in FIGS. 16C, 16D and 16E.

Figure 17:
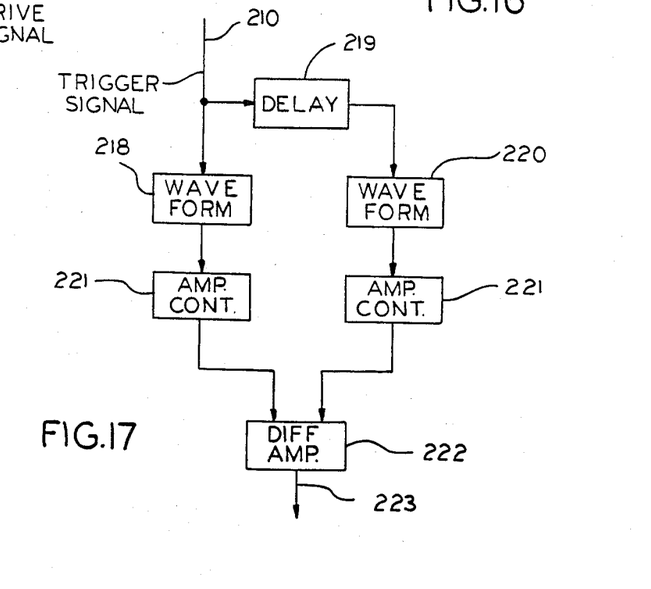

FIG. 17 shows an example of the circuit for forming these driving waveforms. In FIG. 17, when a trigger signal is applied over conductor 210 to a driving waveform forming circuit 218, a waveform such as shown in FIG. 16A is produced as the output. This trigger signal at 210 is also applied to a delay circuit 219 and then is applied to a compensating waveform forming circuit 220, after the passage of a delay predetermined time, yielding the waveform such as that shown in FIG. 16B.

These outputs are applied to an amplitude control circuit 221 and are then synthesized by a synthesizing circuit, such as a differential amplifier 222. In accordance with the delay time determined by the delay circuit 219, the resulting waveform is composed of two mutually overlapping waveforms such as shown in FIG. 16C, two continuous waveforms such as shown in FIG. 16D and two spaced-apart waveforms such as shown in FIG. 16E.

When the ink jet printer is actuated by any of these waveforms, the force of the deflected piezoelectric oscillation plate returning to its original state may be increased by applying, after the formation of the ink droplet, a voltage having an amplitude in the direction which is opposite the direction of the voltage applied at the time when the ink droplet is jetted. Consequently, the time required to return to the original state becomes shorter. The delay time is selected in accordance with the signal response characteristic of the piezoelectric oscillation plate of the ink jetter printer which is employed and with the amplitude of the signal. The time required for the capacity of the pressure chamber to return to its original state is shortened.

As described in the foregoing, in accordance with the present invention, a return voltage has an amplitude in the direction which is opposite to the direction of the driving voltage for jetting the ink. The return voltage is applied to the piezoelectric oscillation plate in order to allow the capacity of the pressure chamber to immediately return to its initial state after jetting of the ink. According to this arrangement, the velocity and size of the ink droplet do not change even if the repetition frequency for forming the ink droplet is increased. Thus, an ink jet printer has a high printing speed and high printing quality.

What is claimed is:

1. A printer head for an ink-on-demand type ink-jet printer for squirting ink droplets onto a printing medium, said printer head comprising:

an ink chamber filled with ink;
a nozzle for squirting said ink droplets;
an ink supply passageway extending from an ink tank to said ink chamber;
an ink delivery passageway extending from said ink chamber to said nozzle;
ink supplying pressure means responsive to an electrical signal for exerting a pressure on said ink in said ink chamber in order to squirt said ink droplets;
one-way fluid control means disposed in both said supply and delivery passageways and having a peripherally clamped elastic and deformable flat member and a valve seat, said deformable member resting on said valve seat and forming at least one open portion through which ink may flow, said open portion being opened and closed by deformation of said deformable member, said deformable member being deformed solely in response to the on demand ink supplying pressure means responding to sdid electrical signal in order to pass said ink in said one-way therethrough, at least one of said deformable member and said valve seat being a solid central disc connected by spokes to the periphery thereof; and
the other of said deformable member and said valve seat being a solid ring shaped member with a center hole positioned over said central disc, whereby said open portion extends through space between said spokes and said center hole, and further whereby the flow resistance may become low under the action of the pressure of the ink in response to the ink stream flow in the direction from the supply side toward the nozzle side and the flow resistance may become high in the opposite direction.

2. The printer head of claim 1 wherein said valve seat is said solid ring shaped member and said deformable member in said central disc and spokes.

3. The printer head of claim 1 wherein said deformable member in said solid ring shaped member and valve seat is said central disc and spokes.

* * * * *